United States Patent
Han et al.

(10) Patent No.: US 10,984,730 B2
(45) Date of Patent: Apr. 20, 2021

(54) DISPLAY DRIVER INTEGRATED CIRCUIT, DISPLAY SYSTEM, AND METHOD FOR DRIVING DISPLAY DRIVER INTEGRATED CIRCUIT

(71) Applicant: Samsung Display Co., Ltd., Yongin-Si (KR)

(72) Inventors: Ho Seok Han, Yongin-si (KR); Hyun Gu Kim, Yongin-si (KR); Jun Yong Park, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/040,260

(22) Filed: Jul. 19, 2018

(65) Prior Publication Data

US 2019/0130845 A1 May 2, 2019

(30) Foreign Application Priority Data

Nov. 1, 2017 (KR) .................. 10-2017-0144798

(51) Int. Cl.
| | |
|---|---|
| G09G 3/3291 | (2016.01) |
| G09G 3/3233 | (2016.01) |
| G06F 3/041 | (2006.01) |
| G09G 3/3266 | (2016.01) |
| G09G 3/3258 | (2016.01) |
| G09G 3/20 | (2006.01) |

(52) U.S. Cl.
CPC ........... *G09G 3/3291* (2013.01); *G06F 3/041* (2013.01); *G06F 3/0412* (2013.01); *G06F 3/0416* (2013.01); *G09G 3/20* (2013.01); *G09G 3/3233* (2013.01); *G09G 3/3258* (2013.01); *G09G 3/3266* (2013.01); *G09G 2370/08* (2013.01)

(58) Field of Classification Search
CPC combination set(s) only.
See application file for complete search history.

(56) References Cited

U.S. PATENT DOCUMENTS

| | | | |
|---|---|---|---|
| 6,771,893 B1 * | 8/2004 | Okamoto | G11B 20/00 386/231 |
| 7,698,550 B2 * | 4/2010 | Abhishek | H04L 63/08 713/160 |

(Continued)

OTHER PUBLICATIONS

"MIPI Alliance Specification for D-PHY", MIPI Board Approved Sep. 22, 2009, 125 pages URL : www.mipi.org.

*Primary Examiner* — Van N Chow
(74) *Attorney, Agent, or Firm* — Innovation Counsel LLP

(57) ABSTRACT

A display system includes: a host processor for outputting a data load command and outputting compensated image data obtained by compensating for image data; a non-volatile memory for storing compensation data for image compensation; and a display module controlled by the host processor, wherein the display module includes: a display panel including a plurality of pixels, the display panel displaying an image, based on the compensated image data; and a display driver integrated chip (DDI) coupled to the host processor through a first interface, the DDI being coupled to the non-volatile memory through a second interface, the DDI including an interface packet converter for performing packet structure conversion on each of first data compatible with the first interface and second data compatible with the second interface.

10 Claims, 9 Drawing Sheets

(56) References Cited

U.S. PATENT DOCUMENTS

| | | | | |
|---|---|---|---|---|
| 8,010,843 B2 * | 8/2011 | Righi | ................. | G06F 11/3656 714/32 |
| 9,842,564 B2 * | 12/2017 | Shao | .................. | H04L 65/1023 |
| 2002/0073234 A1 * | 6/2002 | Ma | ........................ | H04N 1/001 709/246 |
| 2006/0044249 A1 * | 3/2006 | Lee | ..................... | G09G 3/3611 345/98 |
| 2007/0072646 A1 * | 3/2007 | Kuwahara | ........... | H04W 88/085 455/561 |
| 2009/0024756 A1 * | 1/2009 | Spalla | .................. | H04L 1/0057 709/231 |
| 2012/0114047 A1 * | 5/2012 | Ye | .......................... | G06F 3/041 375/240.25 |
| 2013/0222549 A1 * | 8/2013 | Yoon | ................... | H04N 13/239 348/47 |
| 2013/0290909 A1 * | 10/2013 | Gray | ..................... | G01C 21/00 715/854 |
| 2016/0189651 A1 * | 6/2016 | Jung | .................. | G09G 3/3688 345/101 |
| 2017/0124957 A1 | 5/2017 | Ahn et al. | | |
| 2018/0190277 A1 * | 7/2018 | Bhaya | .................... | G10L 15/26 |

* cited by examiner

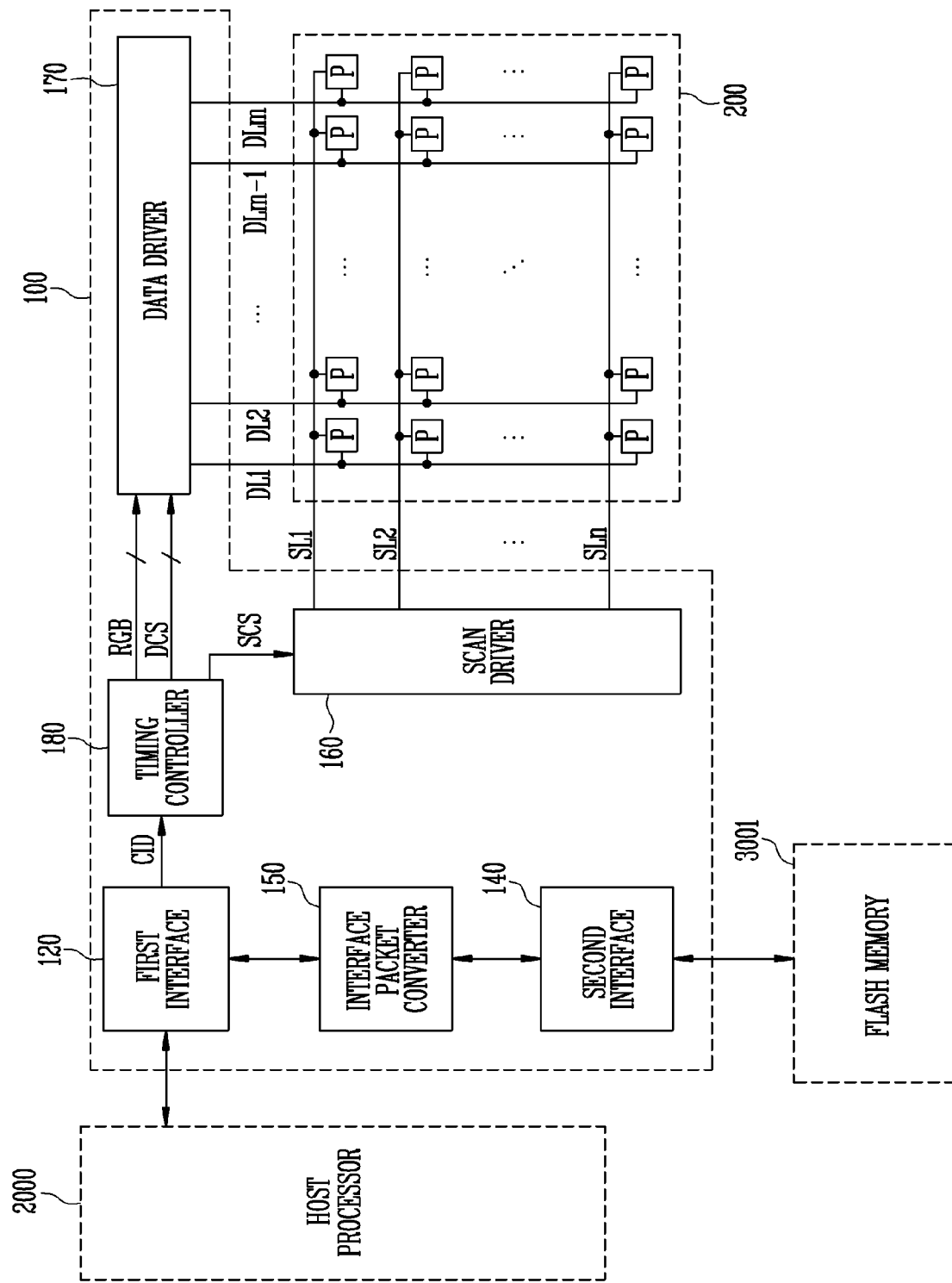

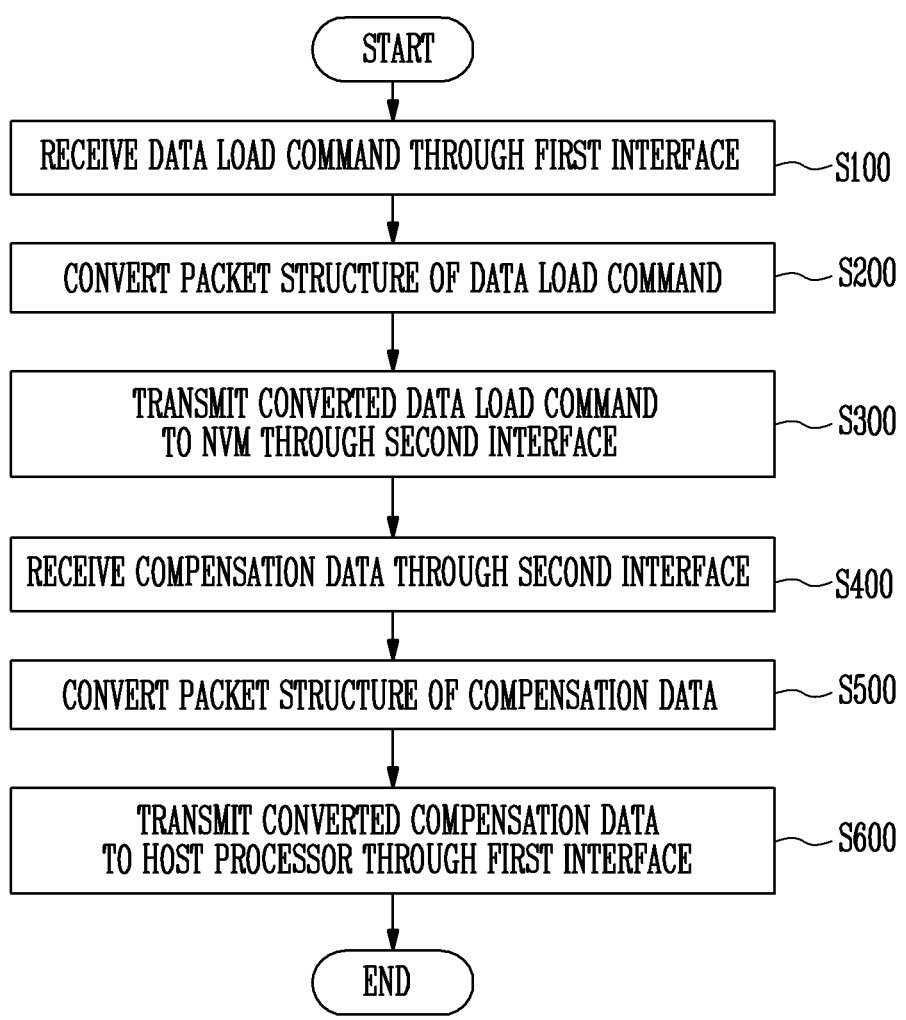

DISPLAY DRIVER INTEGRATED CIRCUIT, DISPLAY SYSTEM, AND METHOD FOR DRIVING DISPLAY DRIVER INTEGRATED CIRCUIT

CROSS-REFERENCE TO RELATED APPLICATION

This application claims priority under 35 U.S.C. § 119(a) to Korean patent application 10-2017-0144798 filed on Nov. 1, 2017 in the Korean Intellectual Property Office, the entire disclosure of which is incorporated herein by reference.

BACKGROUND

1. Technical Field

Example embodiments of the present disclosure relates to an electronic device including a display system. More particularly, example embodiments of the present disclosure relate to a display driver integrated circuit and a display system including the same.

2. Related Art

An electronic device having an image display function, such as a computer, a tablet PC, a smart phone, or a wearable electronic device, includes a display system.

As the performance of a display, an image sensor, and the like, which are included in an electronic device such as a mobile device, is improved and their resolution increases, the amount of data transmission to the display is rapidly increasing. Studies for serial interfaces such as a mobile industry processor interface (MIPI) and a mobile display digital interface (MDDI) have been actively conducted to support images having high resolution of nHD (n*360*640) or more.

Meanwhile, studies have also been actively conducted to compensate for image data having high resolution. Currently, compensation driving for compensating for image data is performed in a DDI (display driver integrated chip, or display driver integrated circuit) of a display system or in the pixels. In one example, the DDI includes a physical compensation block, such as a compensation logic circuit.

For these reasons, the number of physical lanes of an interface between chips or devices used in a display system such as a mobile device is increasing, and many problems can result. For example, degradation of signal integrity due to interference between the chips or devices and electromagnetic interference (EMI) can result, and the increased number of lanes may lead to more complex arrangement of the chips for physical connection. In addition, the size and manufacturing cost of the DDI may increase in order to provide the compensation driving.

SUMMARY

Embodiments provide a display driver integrated chip (DDI) including an interface packet converter for mediating communication between a first interface and a second interface.

Embodiments also provide a display system including the DDI.

Embodiments also provide a method for driving the DDI.

According to example embodiments, there is provided a display system including: a host processor configured to output a data load command and output compensated image data obtained by compensating for image data; a flash memory configured to store compensation data for image compensation; and a display module controlled by the host processor, wherein the display module includes: a display panel including a plurality of pixels to display an image, based on the compensated image data; and a DDI coupled to the host processor through a first interface, the DDI being coupled to the flash memory through a second interface, the DDI including an interface packet converter configured to perform packet structure conversion on each of first data compatible with the first interface and second data compatible with the second interface.

The interface packet converter may include: a first converter configured to rearrange a packet structure of the first data received through the first interface in a format compatible with the second interface; and a second converter configured to rearrange a packet structure of the second data received through the second interface in a format compatible with the first interface.

The first data may correspond to the data load command for loading data stored in the flash memory, and the second data may correspond to the compensation data read from the flash memory, based on the data load command.

The first interface may correspond to a mobile industry processor interface (MIPI), and the second interface may correspond to a serial peripheral interface (SPI).

The compensation data may include at least one of offsets for optical compensation and offsets for afterimage compensation.

The host processor may perform image data compensation on the image data, based on the compensation data, to generate the compensated image data, and provide the compensated image data to the display module through the first interface.

The host processor may include an image data compensator configured to perform at least one of optical compensation and afterimage compensation on the image data, based on the compensation data.

The host processor may perform communication with the flash memory via DDI.

According to example embodiments, there is provided a DDI including: a first interface coupled to communication channels for communication with an external host processor; a second interface coupled to communication channels for communication with an external memory, the second interface being different from the first interface; an interface packet converter configured to perform packet structure conversion on each of first data compatible with the first interface and second data compatible with the second interface; and a timing controller configured to generate a data signal for image display, a scan control signal, and a data control signal by receiving image data processed through the first interface.

The interface packet converter may include: a first converter configured to rearrange a packet structure of the first data received through the first interface in a format compatible with the second interface; and a second converter configured to rearrange a packet structure of the second data received through the second interface in a format compatible with the first interface.

The first data may correspond to a data load command for loading data stored in the memory, and the second data may correspond to data read from the memory, based on the data load command.

The interface packet converter may mediate data transmission between the first interface and the second interface.

The first interface may correspond to a MIPI, and the second interface may correspond to an SPI.

The first interface may conform with MIPI Alliance Specification for Display Serial Interface and MIPI Alliance Specification for D-PHY.

The second interface may correspond to a low-speed serial interface.

The display driver integrated circuit may further include a data driver configured to generate a data voltage in response to the data signal and the data control signal.

The display driver integrated circuit may further include a scan driver configured to generate a scan signal in response to the scan control signal.

According to example embodiments, there is provided a method for driving a DDI, the method including: receiving a data load command for image compensation, which is output from a host processor, through a first interface; converting a packet structure of the data load command to be compatible with a second interface; and transmitting the converted data load command to an external non-volatile memory (NVM) through the second interface.

The method may further include: receiving compensation data loaded from the NVM through the second interface; converting a packet structure of the compensation data to be compatible with the first interface; and transmitting the converted compensation data to the host processor through the first interface.

The first interface may correspond to a MIPI, and the second interface may correspond to an SPI.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 8 is a block diagram illustrating an example of a display module according to an embodiment.

FIG. 11 is a flowchart illustrating an example of the method of FIG. 10.

DETAILED DESCRIPTION

Figure 1:
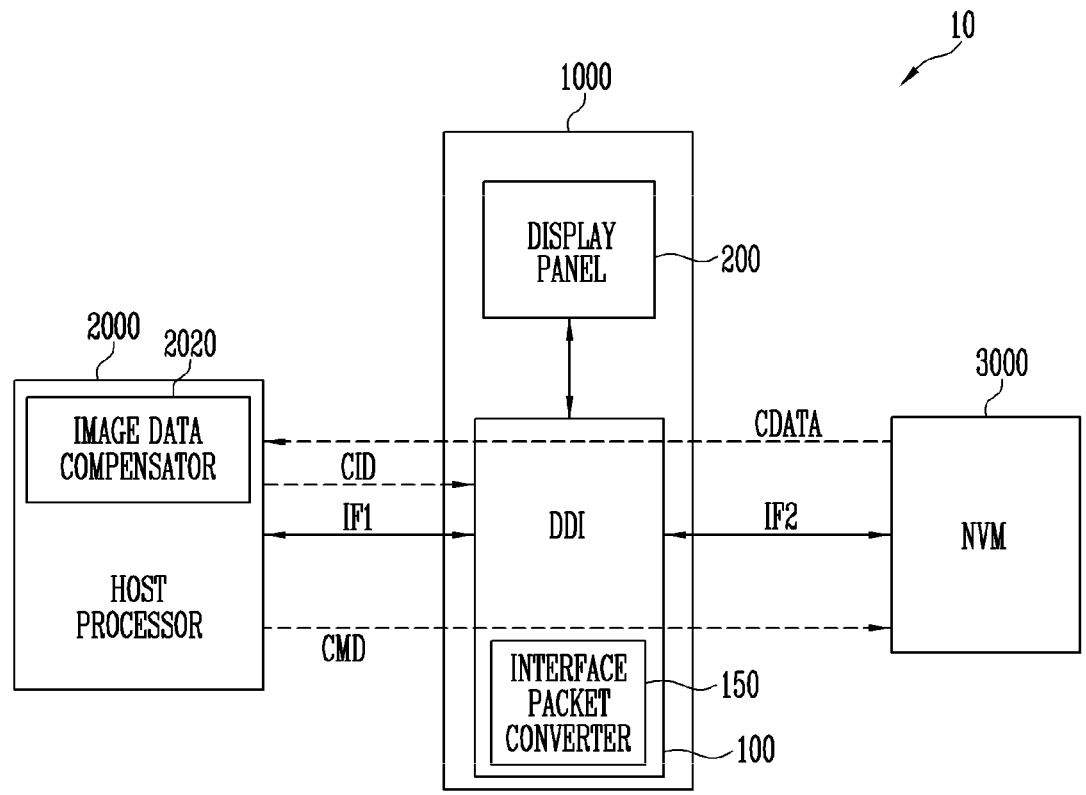
FIG. 1 is a block diagram illustrating a display system according to an embodiment.

Hereinafter, exemplary embodiments of the present disclosure will be described in more detail with reference to the accompanying drawings. Throughout the drawings, like components are designated by like reference numerals, and overlapping descriptions thereof will be omitted.

FIG. 1 is a block diagram illustrating a display system according to an embodiment.

Referring to FIG. 1, the display system 10 may include a display module 1000, a host processor 2000, and a non-volatile memory (NVM) 3000. In an embodiment, the display system 10 may further include an additional storage device, an input/output device, a power management device, a communication module, a camera module, a sensor module, and the like.

In an embodiment, the display system 10 may be implemented with a device capable of using or supporting a mobile industry processor interface (MIPI), e.g., a mobile device such as a mobile phone, a PDA, a PMP, a smart phone, or a wearable device.

The host processor 2000 may control overall operation of the display module 1000. For example, the host processor 2000 may be implemented with a system on chip (SOC). The host processor 2000 may be an application processor (AP) provided in a mobile device.

The host processor 2000 may include a first interface IF1, and may directly communicate data with the display module 1000, i.e., a display driver integrated chip (or display driver integrated circuit, DDI) 100 included in the display module 1000 through the first interface IF1. In an embodiment, the first interface IF1 may correspond to a mobile industry processor interface (MIPI), and accord with MIPI Alliance Specification for Display Serial Interface and MIPI Alliance Specification for D-PHY. However, using MIPI for the first interface IF1 is merely illustrative, and the communication interface between the host processor 2000 and the DDI 100 is not limited thereto. For example, the first interface IF1 may be a serial high-speed interface for supporting a high-quality image of n-high definition (nHD) or higher.

The host processor 2000 may output a data load command CMD and output compensated image data CID obtained by compensating for an image data. In an embodiment, the host processor 2000 may provide the DDI 100 with the data load command CMD for reading (loading) compensation data CDATA from the NVM 3000 through the first interface IF1. The DDI 100 converts a packet structure of the data load command CMD into a format suitable for the NVM 3000 to interpret, and provides the data load command CMD having the converted format to the NVM 3000. That is, the host processor 2000 may indirectly communicate with the NVM 3000 via the display module 1000.

Also, the host processor 2000 may provide the image data or the compensated image data CID to the DDI 100 through the first interface IF1. The DDI 100 may convert the image data or the compensated image data CID into a data signal or data voltage suitable for image display and provide the data signal or data voltage to a display panel 200.

In an embodiment, the host processor 2000 may perform optical compensation and/or afterimage compensation on the image data, based on the compensation data CDATA loaded from the NVM 3000. For example, the compensation data CDATA may include data offset values for optical compensation or afterimage compensation, and the host processor 2000 may generate the compensated image data CID by applying the data offset values to the image data. In an embodiment, the host processor 2000 may include an image data compensator 2020 for performing luminance compensation, gray scale compensation, degradation compensation, etc. for the image data. The image data compensator 2020 may be implemented with a hardware or software compensation algorithm. The hardware or software compensation algorithm may be implemented using techniques already known in the art. For example, the image data compensator 2020 may be implemented with the existing compensation circuits or compensation blocks, typically disposed in the DDI 100. Accordingly, the compensation blocks disposed in the DDI 100 can be eliminated, and the size and power consumption of the DDI 100 can be reduced.

The display module 1000 may include the DDI 100 and the display panel 200.

The display panel 200 may include a plurality of pixels to display an image.

The DDI 100 may be coupled to the host processor 2000 through the first interface IF1, and be coupled to the NVM 3000 through a second interface IF2. The DDI 100 may include an interface packet converter 150 for converting a packet structure of each of first data compatible with the first interface IF1 and second data compatible with the second interface IF2.

The first data may include the data load command CMD, the image data, and the like. The second data may include the compensation data CDATA loaded from the NVM 3000.

In an embodiment, the second interface IF2 may correspond to a low-speed serial interface for data communication of the NVM 3000 (for example, a flash memory). For example, the second interface IF2 may correspond to a serial peripheral interface (SPI). However, using SPI for the second interface IF2 is merely illustrative. In other embodiments, the second interface IF2 may be a synchronous/asynchronous serial interface such as I2C or UART.

Since the first interface IF1 and the second interface IF2 are different from each other, packet structures of data streams transmitted through the first interface IF1 and the second interface IF2 are different from each other. Thus, the NVM 3000 cannot directly receive the data load command output from the host processor 2000. Similarly, the compensation data CDATA loaded from the NVM 3000 cannot be directly provided to the host processor 2000.

Accordingly, the interface packet converter 150 may convert a packet structure of data compatible with the first interface IF1 into a packet structure of data compatible with the second interface IF2, or convert a packet structure of data compatible with the second interface IF2 into a packet structure of data compatible with the first interface IF1. For example, the interface packet converter 150 may interpret a packet structure of data received through each interface and then rearrange the packet structure in a format that accords with an interface through which the packet structure is to be transmitted. As an example, the interface packet converter 150 may perform packet structure conversion (rearrangement) between the MIPI and the SPI. The converted data includes a content substantially identical to that of the original data, but has a format (packet structure) different from that of the original data.

For example, the interface packet converter 150 may convert data defined by standards of the MIPI into serial data (packet) defined by standards of the SPI in the unit of one byte, or convert serial data defined by standards of the SPI into a packet defined by standards of the MIPI.

In an embodiment, the interface packet converter 150 may include a first converter for rearranging a packet structure of the first data received through the first interface IF1 in a format compatible with the second interface IF2 and a second converter for rearranging a packet structure of the second data received through the second interface IF2 in a format compatible with the first interface IF1. The bidirection communication between the host processor 2000 and the NVM 3000 may be performed by interface conversion driving (data stream rearrangement) of the interface packet conversion 150. Accordingly, image data compensation driving in the host processor 2000 can be performed.

The DDI 100 may further include a timing controller and a data driver. The timing controller may generate a data signal for image display, a scan control signal, and a data control signal by receiving image data processed through the first interface IF1. The data driver may generate the data voltage, based on the data signal and the data control signal.

In an embodiment, the DDI 100 may further include a scan driver for generating a scan signal in response to the scan control signal. However, including the scan driver in the DDI is merely illustrative. In other embodiments, the scan driver may be directly disposed in the display panel 200.

The NVM 3000 stores compensation data CDATA for image compensation. The NVM 3000 may be a flash memory. However, the NVM 3000 is not limited to a flash memory, and in other embodiments, the NVM 3000 may be implemented with an NVM capable of processing data of 50 Mbits or more. In an embodiment, the compensation data CDATA may include at least one of offsets for optical compensation and offsets for afterimage compensation. That is, a large-capacity NVM 3000 is to be necessarily included in the display system 10 so as to perform precise image data compensation including afterimage compensation, optical compensation, and the like.

The NVM 3000 may communicate with the DDI 100 through the second interface IF2.

As described above, the DDI 100 includes the interface packet converter 150 for performing packet structure conversion between the interface of the host processor 2000 and the interface of the NVM 3000. Thus, the data communication between the host processor 2000 and the NVM 3000 can be performed without increasing the number of channels (or pins) in the display system 10. Accordingly, an image data compensation operation can be performed in the host processor 2000 instead of the DDI 100.

Thus, the image compensation blocks disposed in the DDI 100 can be removed, and the size and power consumption of the DDI 100 can be reduced. Accordingly, the manufacturing cost of the DDI 100 can be reduced.

Figure 2:
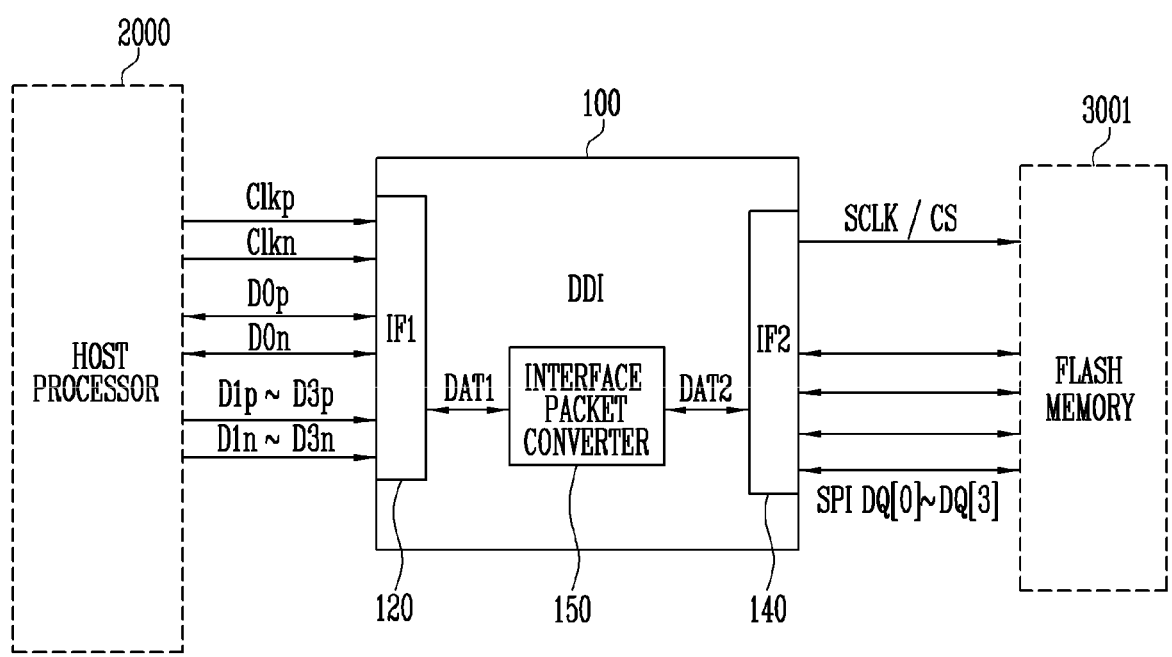
FIG. 2 is a diagram schematically illustrating an example of a display driver integrated chip (DDI) according to an embodiment.

FIG. 2 is a diagram schematically illustrating an example of the DDI according to an embodiment.

Referring to FIG. 2, the DDI 100 may include a first interface IF1 120 for supporting communication with the host processor 2000, a second interface IF2 140 for supporting communication with a flash memory 3001, and an interface packet converter 150 for performing packet structure conversion of each of first data DAT1 compatible with the first interface IF1 and second data DAT2 compatible with the second interface IF2.

In an embodiment, the first interface IF1 may be the MIPI. The first interface IF1 of the DDI 100 may include a slave PHY corresponding to the host processor 2000. For example, the PHY configuration of the first interface IF1 of the DDI 100 may include one clock lane module and at least one data lane module. Each of the lane modules of the PHY configuration communicates with a corresponding lane module in the host processor 200 through channels Clkp, Clkn, D0p to D3p, and D0n to D3n.

The DDI 100 may receive image data, a data load command, and the like from the host processor 2000 through the first interface IF1. Also, the DDI 100 may transmit compensation data converted by the interface packet converter 150 to the host processor 2000.

The second interface IF2 may be the SPI. For example, the second interface IF2 may be a quad SPI. Accordingly, the second interface IF2 communicates with the flash memory 3001 through a clock/chip selector channel SCLK/CS and four data input/output channels DQ[0] to DQ[3].

The DDI 100 may receive compensation data corresponding to the data load command from the flash memory 3001 through the second interface IF2. Also, the DDI 100 may transmit the data load command converted by the interface packet converter 150 to the flash memory 3001.

Figure 3:
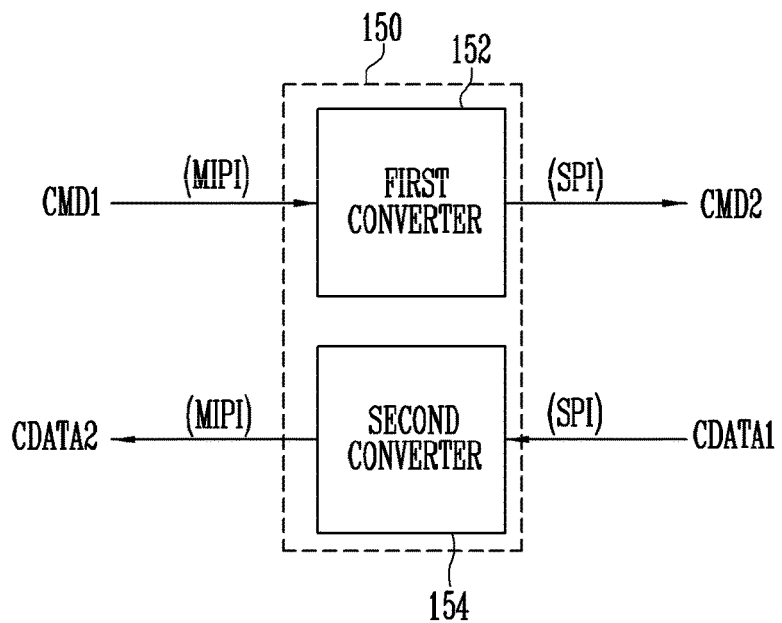
FIG. 3 is a block diagram illustrating an example of an interface packet converter included in the DDI of the display system of FIG. 1.

FIG. 3 is a block diagram illustrating an example of the interface packet converter included in the DDI of the display system of FIG. 1.

Referring to FIGS. 1 to 3, the interface packet converter 150 may include a first converter 152 and a second converter 154.

The first converter 152 may rearrange a packet structure of first data received through the first interface IF1 in a format compatible with the second interface IF2. In an embodiment, the first data may be a data load command CMD1 for loading compensation data CDATA1 stored in the flash memory 3001. For example, the data load command CMD1 may have a data stream corresponding to the MIPI. The first converter 152 may rearrange the data load command CMD1 as a data stream corresponding to the second interface IF2, i.e., the SPI. The content of the converted load command CMD2 may be substantially identical to that of the data load command CMD1. The converted data load command CMD2 may be provided to the flash memory 3001 through the second interface IF2.

The second converter 154 may rearrange a packet structure of second data received through the second interface IF2 in a format compatible with the first interface IF1. In an embodiment, the second data may be compensation data CDATA1 stored in the flash memory 3001. The compensation data CDATA1 may have a data stream corresponding to the SPI. The second converter 154 may rearrange the compensation data CDATA1 as a data stream corresponding to the first interface IF1, i.e., the MIPI. The content of the converted compensation data CDATA2 may be substantially identical to that of the compensation data CDATA1.

As described above, the host system 2000 and the flash memory 3001 can perform communication for image compensation via the DDI 100 including the interface packet converter 150.

Figure 4:
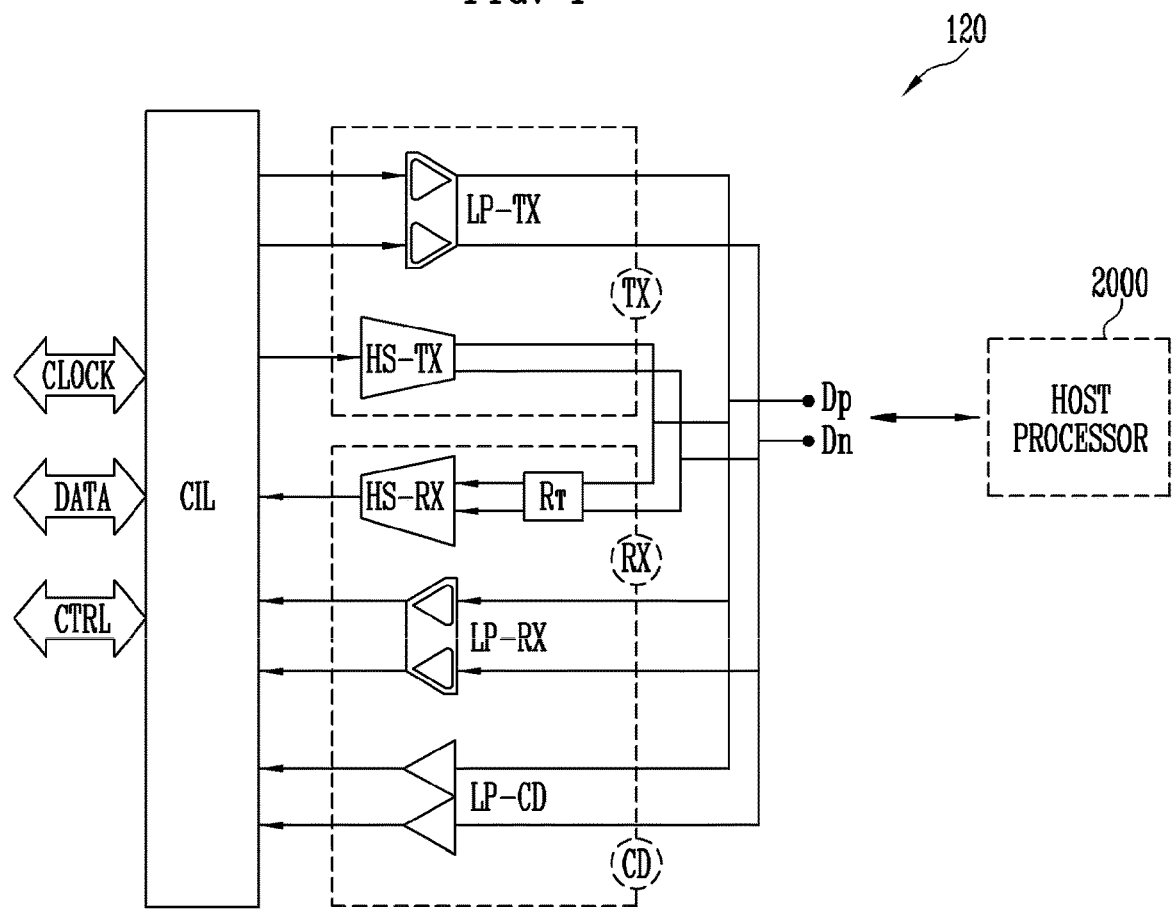
FIG. 4 is a block diagram illustrating an example of a configuration of a first interface included in the DDI according to an embodiment.

FIG. 4 is a block diagram illustrating an example of a configuration of the first interface included in the DDI according an embodiment.

Referring to FIG. 4, the configuration of the first interface 120 includes a PHY configuration according to MIPI standards.

The PHY configuration according to the MIPI standards includes one clock lane module and at least one data lane module. Each of the lane modules of the PHY configuration may communicates with a corresponding lane module at the opposite side of a lane interconnect through two interconnect lines Dp and Dn.

An example of the configuration of one lane having all functions is illustrated in FIG. 4. Each lane may include a control-interface logic CIL and an input/output unit TX, RX, and CD. The input/output unit TX, RX, and CD may include a transmitter TX, a receiver RX, and a collision detector CD. The input/output unit TX, RX, and CD has a high-speed (HS) function related to differential signal input/output simultaneously using the two interconnect lines Dp and Dn and a low-power (LP) function related to single-ended transmission that is individually operated in each of the interconnect lines Dp and Dn.

While high-speed signals have a low voltage swing of, for example, about 200 mV, low-power signals may have a high voltage swing of, for example, about 1.2 V. The HS function is mainly used for high-speed data transmission, and the LP function is mainly used for control. In some cases the HS function and the LP function may be selectively used. Such input/output functions are controlled by the control-interface logic CIL. The control-interface logic CIL performs interfacing with a protocol layer and determines a global operation of each lane module.

The HS function may include a differential transmitter HS-TX and a differential receiver HS-RX. A lane module may include only one of the differential transmitter HS-TX and the differential receiver HS-RX, or include both of the differential transmitter HS-TX and the differential receiver HS-RX. However, the differential transmitter HS-TX and the differential receiver HS-RX included in the lane module cannot be enabled at the same time.

The LP function may include a single-ended transmitter LP-TX, a single-ended receiver LP-RX, and a low-power collision detector LP-CD. When the lane module includes the differential transmitter HS-TX, the lane module necessarily includes the single-ended transmitter LP-TX. Similarly, when the lane module includes the differential receiver HS-RX, the lane module necessarily includes the single-ended receiver LP-RX. The low-power collision detector LP-CD is required to perform only a bidirectional operation. The low-power collision detector LP-CD may be enabled to detect a collision only when the single-ended transmitter LP-TX drives low-power states.

In an embodiment, the data load command output from the host processor 2000 may be transmitted to the DDI 100 through both of the HS function and the LP function. The image data or compensated image data output from the host processor 2000 may be transmitted to the DDI 100 through the HS function. The converted compensation data output from the DDI 100 may be transmitted to the host processor 2000 through the LP function.

Figure 5A:
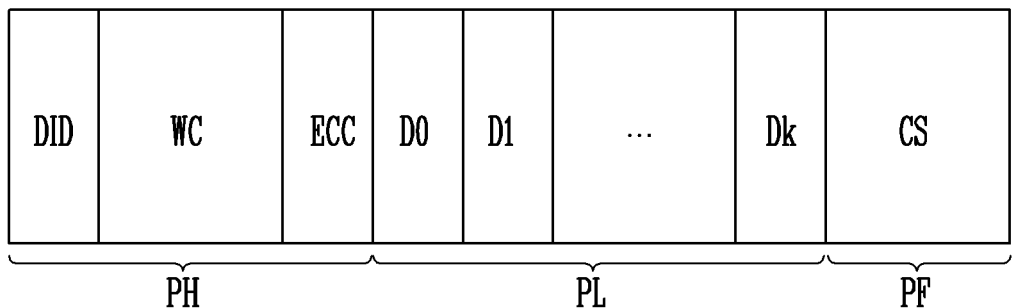
FIGS. 5A to 5C are diagrams schematically illustrating examples of a packet structure according to the first interface of FIG. 4.
Figure 5B:
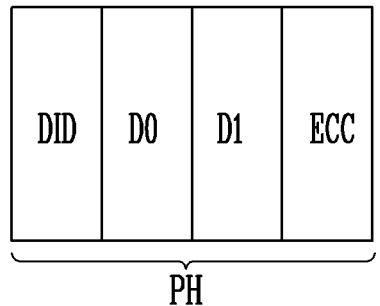
Figure 5C:
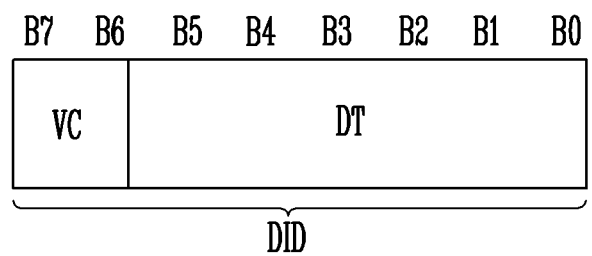

FIGS. 5A to 5C are diagrams schematically illustrating examples of a packet structure according to the first interface of FIG. 4.

The first interface IF1 corresponds to the MIPI. FIG. 5A illustrates a long packet format, FIG. 5B illustrates a short packet format, and FIG. 5C illustrates a data identifier.

Referring to FIG. 5A, a long packet may include a packet header PH of 32 bits, a data payload PL having a variable byte number, and a packet footer of 16 bits. The packet header PH may include a data identifier DID of 8 bits, a word count WC of 16 bits, and an error-correcting code ECC of 8 bits. Each of data D0 to Dk shown in FIG. 5A is data of 8 bits, and the number of data D0 to Dk, i.e., the number of bytes included in the data payload PL corresponds to the word count WC. The packet footer PF may include a checksum CS of 16 bits.

Referring to FIG. 5B, a short packet is configured with a packet header PH. The packet header PH may include a data identifier DID of 8 bits, data D0 and D1 of 2 bytes, and an error-correcting code ECC of 8 bits. A command (e.g., a data load command) may be included at the position of the data D0 and D1 depending on a data type of the short packet. The short packet does not include the packet footer, and the length of the short packet is to be 4 bytes.

Referring to FIG. 5C, a data identifier DID may include two bits B7 and B6 for identifying a virtual channel VC and 6 bits B5 to B0 for identifying a data type DT.

The interface packet converter 150 may identify whether a received packet includes a command and a kind of the command with reference to data types DT of the data identifiers DID included in the long packet and the short packet. For example, the interface packet converter 150 may determine whether the data load command is included in data with reference to the data type DT, and interpret the data. The interface packet converter 150 may rearrange the data load command in a packet structure having a format that accords with the SPI. The content of the data load command is substantially identical to that of the converted data load command.

Figure 6:
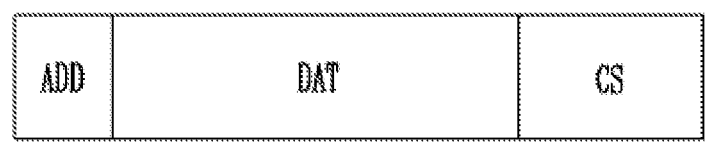
FIG. 6 is a diagram schematically illustrating an example of a packet structure of a second interface included in the DDI.

FIG. 6 is a diagram schematically illustrating an example of a packet structure of the second interface included in the DDI.

The second interface may be the SPI. Referring to FIG. 6, the packet structure defined by standards of the second interface may have a serial data format including an address ADD, data DAT, and a checksum CS.

For example, the compensation data loaded (read) from the flash memory 3001 may have the packet structure of FIG. 6. The interface packet converter 150 may interpret compensation data and rearrange the compensation data in a packet structure defined by standards of the MIPI. The content of the compensation data is substantially identical to that of the converted compensation data.

Figure 7A:
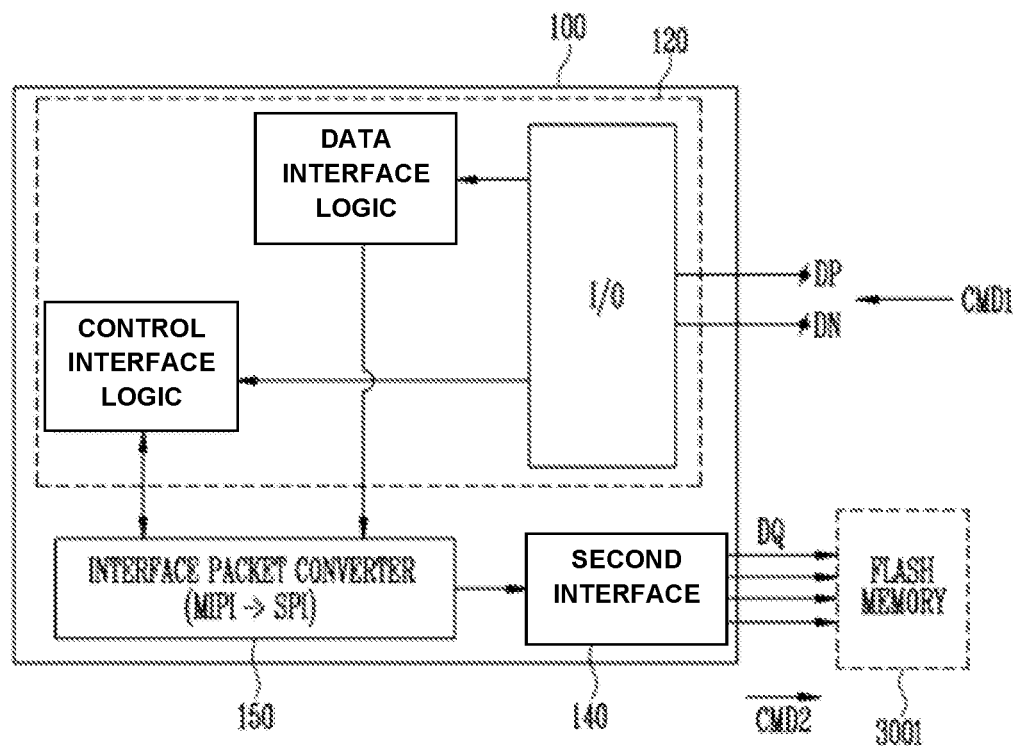
FIG. 7A is a diagram schematically illustrating an example of driving of the DDI included in the display system of FIG. 1.

FIG. 7A is a diagram schematically illustrating an example of driving of the DDI included in the display system of FIG. 1.

FIG. 7A shows driving of the DDI 100 that provides the data load command CMD1 received from the host processor to the flash memory 3001.

The input/output unit of the first interface 120 of the DDI 100 may receive a data load command CMD1 through the interconnect lines Dp and Dn.

When the data load command CMD1 is transmitted through the HS function, the data load command CMD1 may be provided to the interface packet converter 150 via a data interface logic. The data interface logic performs interfacing with the protocol layer at a high speed in the DDI 100. As an example, the data interface logic may determine the data load command CMD1 as a command signal, and the data load command CMD1 may be provided to the interface packet converter 150 and then to the second interface 140 which includes a predetermined deserializer, based on the determination.

When the data load command CMD1 is transmitted through the LP function, the data load command CMD1 may be provided to the interface packet converter 150 via a control interface logic. The control interface logic performs interfacing with the protocol layer in the DDI 100.

The interface packet converter 150 may rearrange the data load command CMD1 in a packet structure that accords with standards of the SPI. The rearranged data stream may be parallelized by an SPI deserializer to be transmitted in the format of a data load command CMD2 converted through the quad SPI to the flash memory 3001.

That is, the data load command of the MIPI format is rearranged as the data load command CMD2 converted in the SPI format via the DDI 100 to be transmitted to the flash memory 3001. Accordingly, a command of the host processor may be transmitted to the flash memory 3001.

Figure 7B:
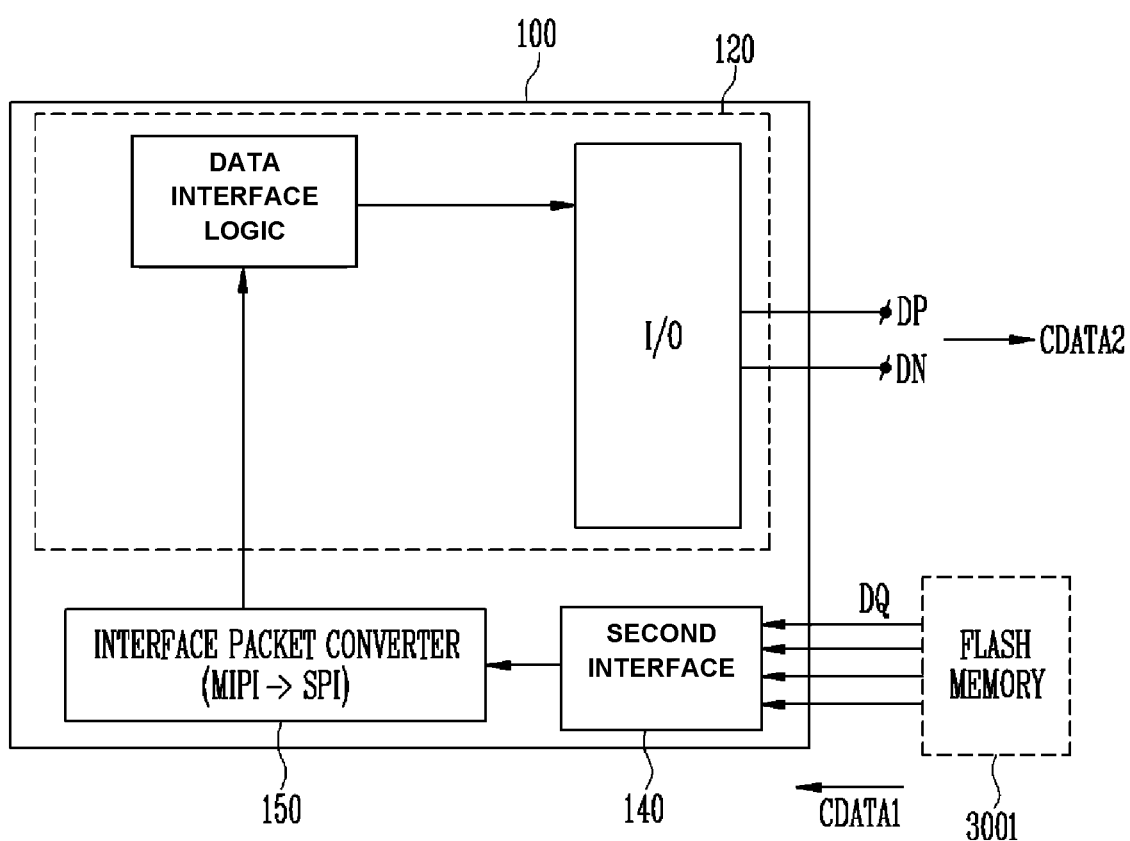
FIG. 7B is a diagram schematically illustrating another example of the driving of the DDI included in the display system of FIG. 1.

FIG. 7B is a diagram schematically illustrating another example of the driving of the DDI included in the display system of FIG. 1.

FIG. 7B illustrates driving of the DDI 100 that provides the compensation data CDATA1 received from the flash memory 3001 to the host memory.

The flash memory 3001 loads the compensation data CDATA1 in response to the converted data load command CMD2. The second interface 140 of the DDI 100 may receive the compensation data CDATA1 through a plurality of signal channels DQ. In an embodiment, the compensation data CDATA1 may be an offset or weighted value for optical compensation, afterimage compensation, etc.

The compensation data CDATA1 may be serialized through the deserializer included in the second interface 140 before being provided to the interface packet converter 150. The interface packet converter 150 may rearrange the compensation data CDATA1 as a packet defined by standards of the MIPI in the unit of one byte. The converted compensation data CDATA2 may be provided to the input/output unit via the most efficient data interface logic in terms of speed. For example, the compensation data may be rearranged in a packet structure defined as an RGB 24 interface that is one of internal interfaces of the DDI 100. A packet structure corresponding to the RGB 24 interface may be compatible with that corresponding to the MIPI. The compensation data CDATA2 converted in the packet structure corresponding to the RGB 24 interface may be transmitted to the host processor through the interconnect lines Dp and Dn via the data interface logic. Here, the converted compensation data CDATA2 is transmitted through the LP function. However, transmitting the converted compensation data CDATA2 through the LP function is merely illustrative. In other embodiments, the converted compensation data CDATA2 may be transmitted through the HS function.

That is, the compensation data in the SPI format is rearranged as the converted compensation data CDATA2 in the MIPI format via the DDI 100 to be loaded to the host processor.

FIG. 8 is a block diagram illustrating an example of a display module according to an embodiment.

Referring to FIGS. 1 and 8, the display module 1000 may include a DDI 100 and a display panel 200.

In FIG. 8, components identical to those described with reference to FIGS. 1 to 7B are designated by like reference numerals, and further descriptions will be omitted.

The DDI 100 may include a first interface 120, a second interface 140, an interface packet converter 150, and a timing controller 180. The DDI 100 may further include a scan driver 160 and a data driver 170. However, in some embodiments, the scan driver 160 may be directly mounted in the display panel 200.

The first interface 120 may support communication with the host processor 2000, such as using the MIPI. The second interface 140 may support communication with the flash memory 3001, such as using the SPI. The interface packet converter 150 may perform packet structure conversion on each of first data compatible with the first interface 120 and second data compatible with the second interface 140.

The timing controller 180 may control driving of the scan driver 160 and the data driver 170. The timing controller 180 may generate data signal RGB for image display, a scan control signal SCS, and a data control signal DCS by receiving compensated image data CID processed through the first interface 120. The timing controller 180 may provide the scan control signal SCS to the scan driver 160 and provide the data control signal DCS to the data driver 170. The data control signal DCS may include a source start signal, a source output enable signal, a source sampling clock, and the like.

The scan driver 160 may generate a scan signal in response to the scan control signal SCS. The scan driver 160 may sequentially or simultaneously supply the scan signal in units of pixel rows to the display panel 200.

The data driver 170 may generate a data voltage in response to the data signal RGB and the data control signal DCS. The data driver 170 may provide the data voltage to the display panel 200.

The display panel 200 may include a plurality of scan lines SL1 to SLn, a plurality of data lines DL1 to DLm, and a plurality of pixel P respectively coupled to the scan lines SL1 to SLn and the data line DL1 to DLm.

Figure 9:
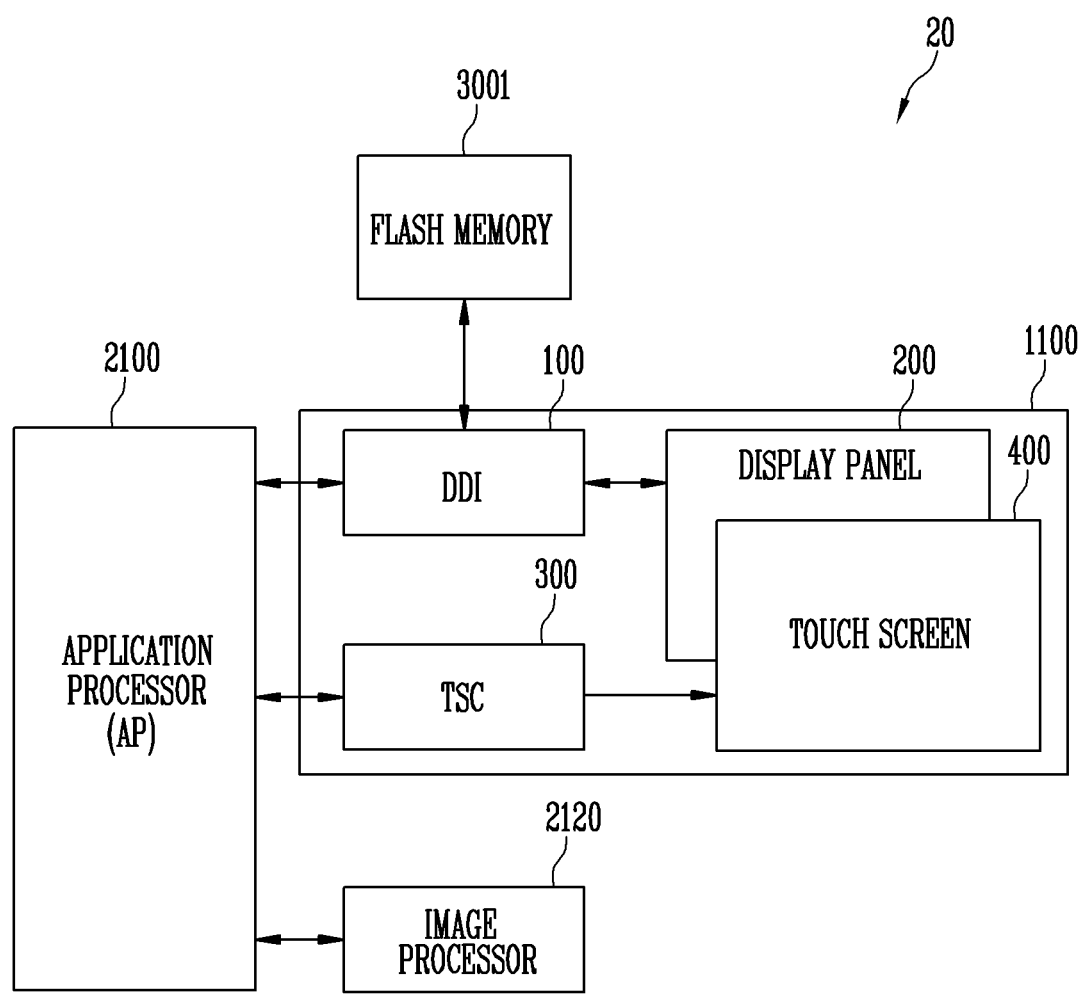
FIG. 9 is a block diagram illustrating a touch screen system to which the display system is applied according to an embodiment.

FIG. 9 is a block diagram illustrating a touch screen system to which the display system is applied according to an embodiment.

In FIG. 9, components identical to those described with reference to FIGS. 1 to 8 are designated by like reference numerals, and further descriptions will be omitted.

Referring to FIG. 9, the display system 20 may include an application processor (AP) 2100, an image processor 2120, a display module 1100, and a flash memory 3001. The display module 1100 may include a DDI 100, a display panel 200, a touch screen controller 300, and a touch screen 400.

The AP 2100 may receive a command or data input from a user and control the DDI 100 and the touch screen controller 300, based on the input data or command. The AP 2100 may be implemented with a graphic card, a system on chip (SOC), etc.

The AP 2100 may be included in the host processor of FIG. 1, and provide image data of the display panel 200 to the DDI 100.

The image processor 2120 may process image data. The image processor 2120 may generate the image data provided to the DDI 100 or perform image processing on the image data, based on a touch signal provided from the touch screen controller 300. In an embodiment, the image processor 2120 may be provided in the AP 2100.

The DDI 100 may drive the display panel 200 under the control of the AP 2100. The DDI 100 may mediate communication for image compensation driving between the AP 2100 and the flash memory 3001.

The display panel 200 may display an image signal received from the DDI 100.

The touch screen controller 300 may be coupled to the touch screen 400, to receive sensing data input from the touch screen 400 and transfer the input sensing data to the AP 2100.

The touch screen 400 may overlap with the display panel 200. In an embodiment, the touch screen 400 may be integrally implemented with the display panel 200.

In an embodiment, the DDI 100 and the touch screen controller 300 may share a plurality of functional blocks, and be implemented as one semiconductor chip.

Figure 10:
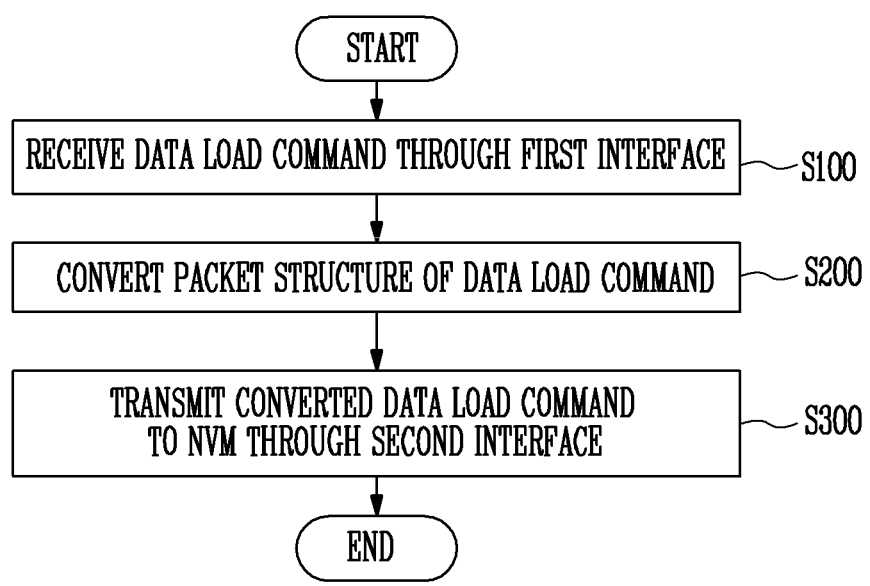
FIG. 10 is a flowchart illustrating a method for driving the DDI according to an embodiment.

FIG. 10 is a flowchart illustrating a method for driving the DDI according to an embodiment. FIG. 11 is a flowchart illustrating an example of the method of FIG. 10.

The methods of FIGS. 10 and 11 have been described in detail with reference to FIGS. 1 to 8, and therefore, further descriptions will be omitted.

Referring to FIGS. 10 and 11, the DDI may mediate communication for compensation driving of image data between the host processor and the flash memory.

As shown in FIG. 10, the DDI may transmit a data load command received from the host processor to the flash memory. Specifically, the DDI may receive a data load command for image compensation, which is output from the host processor, through the first interface (S100), convert (rearrange) a packet structure of the data load command to be compatible with the second interface (S200), and then transmit the converted data load command to an external NVM through the second interface (S300).

Accordingly, the host processor can issue a compensation data load command to the flash memory by using the DDI to mediate the communication with the flash memory.

As shown in FIG. 11, the DDI may transmit compensation data received from the flash memory to the host processor. Specifically, the DDI may receive compensation data loaded from the NVM through the second interface (S400), convert a packet structure of the compensation data to be compatible with the first interface (S500), and then transmit the converted compensation data to the host processor through the first interface (S600).

Accordingly, the flash memory can response to the data load command of the host processor and transmit the compensation data to the host process by using the DDI to mediate the communication with the host processor. An image data compensation operation can be performed in the host process itself through such data communication.

As described above, in the DDI and the display system including the same according to the embodiment of the present disclosure, the DDI mediates data communication between the host processor and the flash memory, so that the host processor can directly perform image data compensation including optical compensation, afterimage compensation, and the like. Thus, a considerable number of channels for communication between the host processor and various types of functional units can be eliminated. Further, image compensation blocks including the existing compensation circuit and the like, which are typically disposed in the DDI, are can be removed from the DDI, so that the size and manufacturing cost of the DDI can be reduced. Furthermore, image compensation driving is performed in the host processor instead of the DDI, so that the total power consumption of the display system can be reduced.

The present disclosure can be applied to display systems and electronic devices, which include display modules. For example, the present disclosure can be applied to mobile display electronic devices, wearable devices, and the like.

According to the present disclosure, the DDI mediates data communication between the host processor and the flash memory by rearranging an interface packet structure. Thus, compensation blocks disposed in the DDI are eliminated, and the size and power consumption of the DDI can be reduced. In addition, the number and power consumption of interconnect channels can be reduced in display signal processing, and signals for supporting other protocols and interfaces can be communicated without adding interconnect lines.

Further, according to the example embodiments, the display system includes the DDI, so that the host processor can directly perform image data compensation including optical compensation, afterimage compensation, and the like. Thus, image compensation blocks such as a compensation circuit, and/or a compensation circuit chip can be removed from the DDI, so that the size and manufacturing cost of the DDI can be reduced. Further, image compensation driving is performed in the host processor instead of the DDI, so that the total power consumption of the display system can be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display system comprising:
a host processor configured to output a data load command and outputs compensated image data obtained by compensating for image data;
a non-volatile memory configured to store compensation data for image compensation; and
a display module controlled by the host processor,
wherein the display module includes:
a display panel including a plurality of pixels to display an image based on the compensated image data; and
a display driver integrated chip (DDI) including a first interface and a second interface and coupled to the host processor through the first interface, the DDI being coupled to the non-volatile memory through the second interface, the DDI including an interface packet converter configured to perform packet structure conversion on each of first data compatible with the first interface and second data compatible with the second interface,
wherein the interface packet converter converts a packet structure of the first data received from the host processor through the first interface in a format compatible with the second interface and converts a packet structure of the second data received from the non-volatile memory through the second interface in a format compatible with the first interface, and
wherein the converted second data is transmitted to the host processor through the first interface included in the DDI.

2. The display system of claim 1, wherein the interface packet converter includes:
a first converter configured to rearrange the packet structure of the first data received through the first interface in the format compatible with the second interface; and
a second converter configured to rearrange the packet structure of the second data received through the second interface in the format compatible with the first interface.

3. The display system of claim 2, wherein the first data corresponds to the data load command for loading data stored in the non-volatile memory, and
the second data corresponds to the compensation data read from the non-volatile memory based on the data load command.

4. The display system of claim 2, wherein the first interface corresponds to a mobile industry processor interface (MIPI), and the second interface corresponds to a serial peripheral interface (SPI).

5. The display system of claim 1, wherein the compensation data includes at least one of offsets for optical compensation and offsets for afterimage compensation.

6. The display system of claim 5, wherein the host processor performs image data compensation on the image data, based on the compensation data, to generate the compensated image data, and provides the compensated image data to the display module through the first interface.

7. The display system of claim 5, wherein the host processor includes an image data compensator configured to perform at least one of optical compensation and afterimage compensation on the image data, based on the compensation data.

8. The display system of claim 1, wherein the host processor performs communication with the non-volatile memory via the DDI.

9. A method for driving a display system which comprises a host processor, an external non-volatile memory (NVM), and a display module, the display module including a display driver integrated chip (DDI), the method comprising:
receiving a data load command for image compensation, which is output from the host processor, through a first interface disposed in the display module;
converting a packet structure of the data load command to be compatible with a second interface disposed in the display module;
transmitting the converted data load command to the NVM through the second interface;
receiving compensation data loaded from the NVM through the second interface;
converting a packet structure of the compensation data to be compatible with the first interface; and
transmitting the converted compensation data to the host processor through the first interface.

10. The method of claim 9, wherein the first interface corresponds to a mobile industry processor interface (MIPI), and the second interface corresponds to a serial peripheral interface (SPI).

* * * * *